United States Patent Office 2,727,208
Patented Dec. 13, 1955

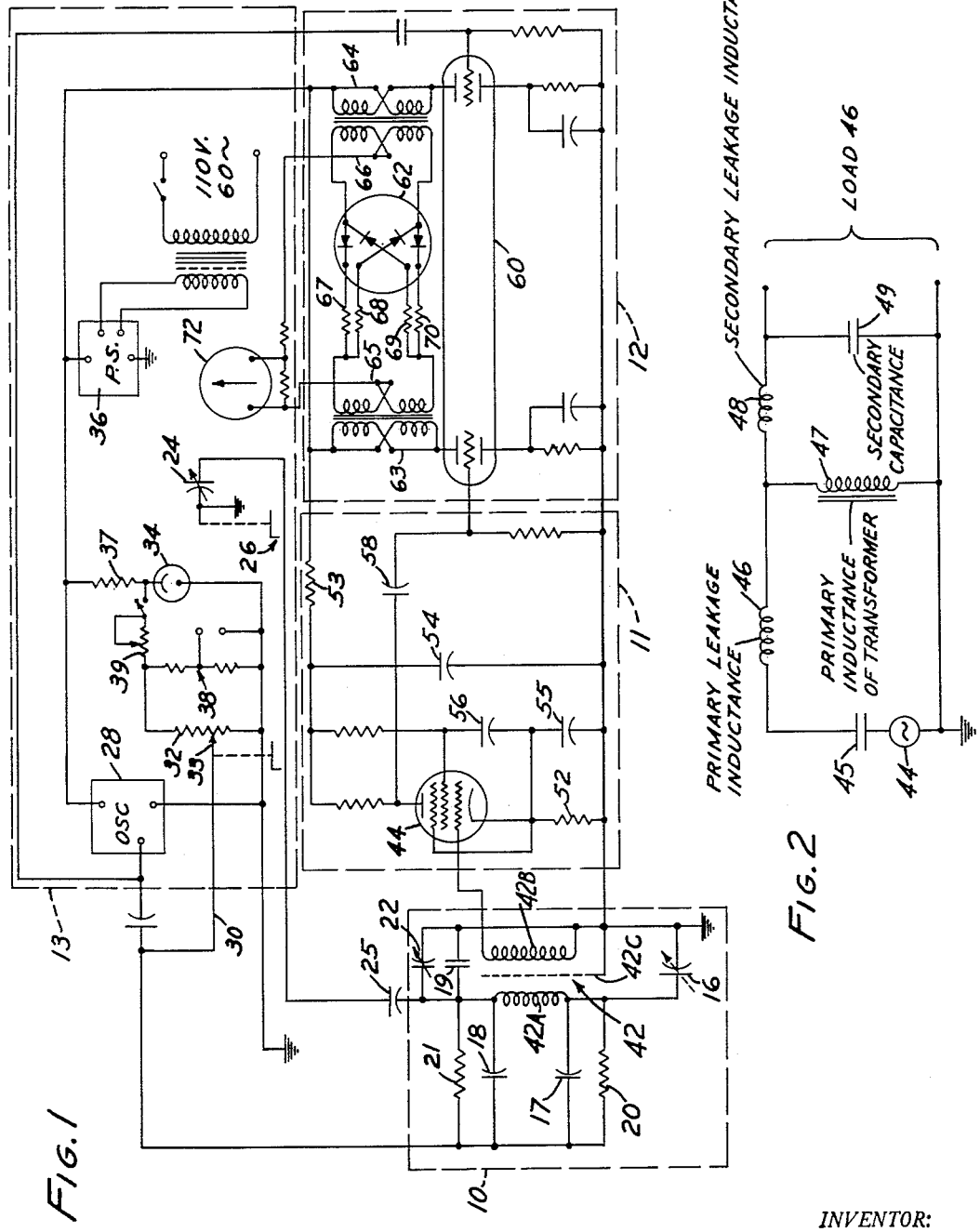

2,727,208

BRIDGE CIRCUIT

Carl P. Spaulding, Pasadena, Calif., assignor to Consolidated Engineering Corporation, Pasadena, Calif., a corporation of California Application February 11, 1950, Serial No. 143,619

3 Claims. (Cl. 324—60)

This invention relates to the measurment of capacitance and more particularly, to an electrical circuit for detecting and measuring extremely small changes in capacity. The circuit is sensitive to capacitance variations in the order of magnitude of $10^{-2}$ micromicrofarads and has the advantage of sensitivity to slow capacitance fluctuations.

Although the circuit of the invention finds application under any circumstances where it is necessary to detect small changes in capacitance, it is particularly suited to the field of capacity gauging wherein such parameters as pressure, weight, length, etc., are measured by capacity changes developed respective to variations in the parameter. One form of such apparatus is illustrated and described in my co-pending United States patent application, Serial No. 143,620, filed February 11, 1950, now Patent No. 2,667,786.

In the co-pending application a pressure gauge is described and illustrated which comprises a flexible diaphragm separating two chambers, a conductive member spaced from the diaphragm approximately .005 inch or less, means for connecting one of the chambers to a system, the pressure of which is to be measured, and means for connecting the other of the two chambers to a reference pressure source. The diaphragm and conductive member form a capacitor with a dielectric gap of less than .005 inch. Depending upon the size of the dielectric gap, this pressure gauge is sensitive to pressure differentials of only a few microns provided the associated electrical circuit is equally sensitive to the corresponding changes in capacitance of the gauge capacitor. The circuit described herein fulfills this requirement.

The circuit of the invention comprises a bridge, one leg of which consists of the capacitor, the capacitance variations of which are to be determined. The bridge is coupled through a transformer to an amplifier and phase sensitive detector, and an oscillator is connected to feed a carrier signal to the bridge and detector. The circuit is adapted to develop a signal of measurable magnitude responsive to unbalance of the bridge due to changes in the capacitance of said capacitor. In a preferred embodiment, a variable source of D. C. voltage is connected in parallel with the oscillator across the input terminals of the bridge. By means of this D. C. voltage, an electrostatic pressure can be developed across the variable capacitor to restore it to a balanced value where the subject capacitor is of the flexible diaphragm type. In the alternative, the amplified unbalance voltage may be taken as a measure of the capacitance change or the bridge may be balanced by varying the impedance across another arm or arms, the increment required to restore a balanced condition being an indicia of the capacitance change in the capacitor under investigation.

To develop a circuit for sensing and measuring capacitance changes in the order of magnitude above mentioned, it was necessary to minimize the response of the circuit to changes in circuit elements other than the capacitance to be measured, which objective has been attained in the present circuit by several expedients. As will be more fully explained hereinafter, the capacitive source impedance of the bridge is caused to work into an inductive load. By this means the source impedance and load impedance may be matched to obtain maximum power transfer. The source and load impedance are matched by employing a transformer having a primary reactance in resonance with the capacitive source impedance at the frequency of the carrier signal. By thus matching the impedances, the circuit response is limited to a narrow frequency band which reduces the effect of extraneous signals of a frequency other than the carrier frequency.

The response to extraneous signals is further minimized by employing a phase sensitive detector or a demodulator which functions to exclude all signals due to resistance changes since such signals are generally out-of-phase with signals due to capacity changes.

The invention will be more clearly understood by reference to the accompanying drawing in which:

Fig. 1 is a circuit diagram of a preferred embodiment of the invention particularly adapted for use with a flexible diaphragm-type gauge;

Fig. 2 is a simplified equivalent circuit diagram of the bridge and transformer portions of the circuit of Fig. 1.

Referring to Fig. 1, the circuit there shown consists of a bridge network 10, an amplifier 11, a phase sensitive detector 12 and an oscillator and power supply network 13. The four legs of the bridge 10 are formed by the capacitors 16, 17, 18 and 19, respectively. The capacitor 16 represents the capacitance, the variations of which are to be measured and is designated as a variable capacitor by a dotted arrow. With reference to the pressure gauge described above, the capacitor 16 is representative of the capacitor formed by the diaphragm and adjacent conductive member in the gauge. A pair of resistors 20, 21 are connected respectively in parallel with capacitors 17 and 18 of the second and third legs of the bridge. The function of these resistors will be more apparent after further description of the circuit. A variable capacitor 22 is connected in parallel across the fourth leg of the bridge formed by the capacitor 19 and another variable capacitor 24 is connected in series with a fixed capacitor 25, the two capacitors 24, 25 being connected in parallel across the capacitor 19. In this arrangement the capacitor 22 provides means for coarse adjustment in balancing the bridge and the capacitor 24, being in series with a fixed capacitor 25, provides means for fine adjustment in bridge balance. An adjusting knob 26 indicates this function of the capacitor 24.

An oscillator 28 is connected across the bridge input at the terminals formed at the junction of the second and third arms and first and fourth arms, respectively. In the preferred embodiment shown in the drawing, means are also provided for applying a D. C. voltage through lead 30 to the bridge input. The D. C. voltage supply network is used when the circuit is employed with a gauge of the type described above and it is desired to apply across the gauge capacitor an electrostatic restoring force to restore the diaphragm to a centered or null position. If the capacitance variation in the capacitor 16 is to be ascertained by balancing the unbalanced bridge through suiatble adjustment of capacitors 22, 24, or by measuring the output signal developed by the unbalanced bridge, the D. C. voltage supply network has no function and may be eliminated from the circuit. The D. C. voltage supply network comprises a potentiometer 32 having an adjustable tap 33 connected to the lead 30. A uniform voltage is applied across the potentiometer 32 through a voltage regulator tube 34 from a D. C. power source 36. A voltage divider circuit 38 is connected in parallel across the potentiometer 32 to provide means for periodically calibrating the voltage output of tube 34 and an adjustable slidewire 39 provides means for adjusting the voltage supplied across the potentiometer.

A step-up transformer 42 has its primary coil 42A connected across the bridge output at the terminals formed by the junction of legs 1 and 2 and 3 and 4, respectively, and its secondary 42B connected to feed a signal to the grid of an amplifier tube 44.

As described above, the transformer is designed so that the primary reactance less the secondary capacitive reactance of the transformer will be equal and opposite to the capacitive reactance of the bridge and hence, in resonance therewith at the signal frequency. An equivalent circuit is illustrated in Fig. 2 to further clarify this relationship. Referring to this figure, the equivalent circuit of the bridge is represented by a voltage source 44 and a capacitor 45 connected through the transformer equivalent circuit to a load 46. The capacitor 45 represents the total source impedance of the bridge network. The equivalent circuit of the transformer includes three inductances; the primary inductance and the primary and secondary leakage inductances represented respectively by circuit elements 46, 47, 48 and a secondary capacitance represented by capacitor 49. If the primary and secondary leakage inductances are neglected, then it is apparent that maximum voltage will appear across the load 46 when the total reactance of the transformer circuit, which is now represented by the primry inductance and secondary capacitance in parallel, is equal and opposite to the source impedance of the bridge. In practice, the second order effects of the primary and secondary leakage inductances are effectively eliminated by tuning the oscillator to the correct frequency for resonance.

A conventional resistance coupled circuit, i. e., working from a resistance source into a resistance load, has a broad band sensitivity to noise and a low output voltage to source voltage ratio. In the inductance coupled circuit of the invention, the ratio of output voltage across the load 46 to source voltage developed in the bridge 45 is approximately 100 times the ratio of these voltages in a resistance coupled circuit.

Referring again to Fig. 1, transformer 42 is provided with a grounded shield 42C which prevents balanced voltages from capacitatively coupling into the secondary. The output of the transformer secondary is fed to the grid of an amplifier tube 44. The amplifier network is conventional and includes a cathode bias resistor 52, a plate circuit comprising a resistor 53, and capacitor 54, a cathode bypass capacitor 55 to avoid cathode degeneration and a filter capacitor 56. The amplifier is coupled to the phase sensitive detector 12 through a capacitor 58 supplying the signal to one grid of the detector tube 60. The phase sensitive detector illustrated in Fig. 1 is the same as that described in my co-pending application, Serial No. 98,256, filed June 10, 1949, now abandoned, and includes a rectifier bridge 62 of ring type, a first transformer 63 connected across the bridge for impressing the input signal thereon, a second transformer 64 connected across the bridge, in the opposite direction for impressing a carrier wave on the bridge, output leads 65, 66 connected respectively to the center taps of transformers 63, 64, and separate ohmic resistors 67, 68, 69, 70 connected in series with each rectifier element in the bridge. The amplifier 11 and oscillator 28 are coupled to the input transformer 63 and carrier transformer 64, respectively, through power amplifier tube 60 to further strengthen the received signal.

In the present circuit, the reference carrier signal to the detector is supplied from the same oscillator 28 which feeds the carrier signal to the bridge. By this means the effects of signals originating in the bridge circuit due to resistance unbalance are eliminated and no resistance balance is required.

The output of the detector 12 is fed into a meter 72, the reading of which may be used as a measure of the capacitance variation in the bridge capacitor 16. Alternatively, the bridge may be balanced to maintain meter 72 at a null position by adjusting the variable capacitors 22 and 24. In this case, the adjustment required in these capacitors will give a measure of the capacitance variation in capacitor 16. In the event the capacitor 16 constitutes a diaphragm-type gauge as described above, a third and preferred alternative procedure may be used wherein a D. C. voltage is tapped from potentiometer 32 and supplied to the bridge 10 to produce an electrostatic restoring force across the capacitor 16 to maintain the capacitor diaphragm in a centered position. In this procedure, the tap 33 of the source potentiometer 32 may be adjusted manually, or by means well known in the art, the voltage appearing across the meter 72 may be fed to a servo-mechanism (not shown) adapted to automatically adjust the tap 33 of potentiometer 32 to maintain the circuit at all times at a null condition.

The resistors 20, 21 connected in parallel across the bridge capacitors 17, 18, respectively, furnish a path for the current from the D. C. source to charge the gauge capacitor. If one of the alternative sensing methods is used in which no electrostatic restoring force is developed from the D. C. source, the resistors 20, 21 still perform the necessary function of furnishing a path to ground for stray charges developing on the capacitor under investigation.

I claim:

1. A circuit for sensing small capacitance changes in a capacitor having a flexible diaphragm as one plate comprising a capacitance bridge, said capacitor forming one leg of the bridge, an amplifier, a step-up transformer coupled to feed the output of the bridge to the amplifier, a phase sensitive detector connected to receive the amplifier output, an oscillator connected to feed a carrier signal to the bridge and to the detector, a D. C. source connected to feed a variable D. C. signal to the bridge to develop an electrostatic restoring force on said capacitor of sufficient magnitude to balance the bridge, and means for measuring the magnitude of the D. C. signal.

2. A circuit for sensing small capacitance changes in a capacitor having a flexible diaphragm as one plate wherein capacitance variations are due to diaphragm deflections, which circuit comprises a capacitance bridge, said capacitor forming one leg of the bridge, an amplifier, a step-up transformer coupled to feed the output of the bridge to the amplifier, the primary reactance of the transformer being of such value as to resonate with the capacitive source impedance of the bridge, a phase sensitive detector connected to receive the amplifier output, an oscillator connected to feed a carrier signal to the bridge and to the detector, and a D. C. source connected to feed a variable D. C. signal to the bridge to develop an electrostatic field across said capacitor in opposition to said diaphragm deflection.

3. A circuit for sensing small changes of capacitance in a first capacitor having a flexible diaphragm as one plate thereof, which circuit comprises a bridge network, said first capacitor forming a first leg of the bridge; second, third and fourth capacitors forming second, third and fourth legs of the bridge, a variable capacitor connected across the fourth capacitor, a separate resistor connected across each of the second and third capacitors, an oscillator connected between the terminals formed by the junction of the second and third legs and the first and fourth legs of the bridge, respectively, means grounding the terminal of the first and fourth legs of the bridge, a step-up transformer connected through its primary winding between the opposite terminals of the bridge, the primary reactance of the transformer being of such value as to resonate with the capacitative source of the bridge at the oscillator frequency, an amplifier connected across the secondary winding of the transformer to amplify the unbalance signal of the bridge, a phase sensitive detector connected to the amplifier and to said oscillator to demodulate the amplified unbalanced signal, and a variable source of D. C. voltage connected across the bridge in parallel with the oscillator to develop across said first capacitor an electrostatic field of sufficient strength to balance the bridge by deflection of the diaphragm, the balanced condition of the bridge being evidenced by zero output from the detector.

References Cited in the file of this patent

UNITED STATES PATENTS

| | | |
|---|---|---|
| 1,757,659 | Edenburg | May 6, 1930 |
| 1,931,460 | Lilienfeld | Oct. 17, 1933 |
| 1,939,067 | Legg | Dec. 12, 1933 |
| 1,975,226 | Zoeten | Oct. 2, 1934 |
| 2,147,746 | Luck et al. | Feb. 21, 1939 |
| 2,190,488 | Schnoll | Feb. 13, 1940 |
| 2,567,253 | Strange et al. | Sept. 11, 1951 |
| 2,589,758 | Wojciechowski | Mar. 18, 1952 |
| 2,611,021 | Perls et al. | Sept. 16, 1952 |